(12) United States Patent
Lang

(10) Patent No.: US 12,498,093 B2
(45) Date of Patent: Dec. 16, 2025

(54) COMPONENT FOR A TRANSPORTATION DEVICE, TRANSPORTATION DEVICE, AND METHOD FOR PRODUCING THE COMPONENT

(71) Applicant: Bayerische Motoren Werke Aktiengesellschaft, Munich (DE)

(72) Inventor: Andreas Lang, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/568,906

(22) PCT Filed: Jul. 29, 2022

(86) PCT No.: PCT/EP2022/071298
§ 371 (c)(1),
(2) Date: Dec. 11, 2023

(87) PCT Pub. No.: WO2023/025513
PCT Pub. Date: Mar. 2, 2023

(65) Prior Publication Data
US 2024/0271770 A1    Aug. 15, 2024

(30) Foreign Application Priority Data

Aug. 23, 2021   (DE) .................... 10 2021 121 783.0

(51) Int. Cl.
*F21S 41/29* (2018.01)
*B29D 11/00* (2006.01)
*F21S 41/24* (2018.01)
*F21S 41/50* (2018.01)
*F21S 43/235* (2018.01)
*F21S 43/27* (2018.01)
*F21S 43/50* (2018.01)
(Continued)

(52) U.S. Cl.
CPC ........ *F21S 41/29* (2018.01); *B29D 11/00673* (2013.01); *F21S 41/24* (2018.01);
(Continued)

(58) Field of Classification Search
CPC .......... F21S 41/25; F21S 41/295; F21S 45/47; F21S 41/24; F21S 43/235; F21S 43/237;
(Continued)

(56) References Cited

U.S. PATENT DOCUMENTS 3,235,720  A  *  2/1966  Bridge ................. B60Q 1/2626
D26/36
6,152,586  A     11/2000  Dealey, Jr. et al.
(Continued)

FOREIGN PATENT DOCUMENTS

DE    10 2004 028 970 A1    2/2006
DE    10 2010 026 232 A1    1/2012
(Continued)

OTHER PUBLICATIONS

English translation of JPS61285602A (Year: 1986).*
(Continued)

*Primary Examiner* — Omar Rojas Cadima
(74) *Attorney, Agent, or Firm* — Crowell & Moring LLP

(57) ABSTRACT

A component for a transportation device includes a support structure, a cover portion, an elastic seal portion, which is formed between the support structure and the cover portion and which is integrally bonded to the support structure and/or to the cover portion, and an optical waveguide. The support structure, the cover portion and the seal portion delimit a receptacle, which is sealed by the seal portion and in which the optical waveguide is accommodated.

12 Claims, 4 Drawing Sheets

(51) Int. Cl.
*F21S 45/00* (2018.01)
*B29C 45/14* (2006.01)
*B29K 21/00* (2006.01)
*B29K 75/00* (2006.01)
*B29L 11/00* (2006.01)

(52) U.S. Cl.
CPC ............. *F21S 41/50* (2018.01); *F21S 43/235* (2018.01); *F21S 43/27* (2018.01); *F21S 43/50* (2018.01); *F21S 45/00* (2018.01); *B29C 45/14* (2013.01); *B29K 2021/003* (2013.01); *B29K 2075/00* (2013.01); *B29L 2011/0075* (2013.01)

(58) Field of Classification Search
CPC .. F21S 41/29; F21S 43/27; F21S 45/10; F21S 45/50; B29D 11/00009; B29D 11/00673; B29K 2995/0025; B29K 2995/0026; B29L 2011/0075; B60Q 1/0011
USPC .......................................................... 362/520
See application file for complete search history.

(56) References Cited

U.S. PATENT DOCUMENTS

| | | | |
|---|---|---|---|
| 6,270,242 B1 * | 8/2001 | Suzuki | .................. B29C 44/12 |
| | | | 362/531 |
| 6,523,986 B1 | 2/2003 | Hoffmann | |
| 2017/0073048 A1 * | 3/2017 | Butcher | ................ F21V 31/005 |
| 2018/0172239 A1 | 6/2018 | Wacker et al. | |
| 2018/0272927 A1 | 9/2018 | Moore et al. | |

FOREIGN PATENT DOCUMENTS

| | | | | |
|---|---|---|---|---|
| DE | 10 2018 207 471 A1 | 3/2019 | | |
| DE | 20 2019 005 357 U1 | 6/2020 | | |
| DE | 10 2019 128 963 A1 | 4/2021 | | |
| EP | 3421877 A1 * | 1/2019 | ........... | F21S 43/237 |
| FR | 2630526 A1 * | 10/1989 | | |
| JP | S61285602 A * | 12/1986 | | |

OTHER PUBLICATIONS

Search English translation of FR-2630526-A1.*
Search English translation of EP-3421877-A1 (Year: 2019).*
International Search Report (PCT/ISA/210) issued in PCT Application No. PCT/EP2022/071298 dated Dec. 13, 2022 with English translation (5 pages).
German-language Written Opinion (PCT/ISA/237) issued in PCT Application No. PCT/EP2022/071298 dated Dec. 13, 2022 with English translation (7 pages).
German-language Search Report issued in German Application No. 10 2021 121 783.0 dated Mar. 28, 2022 with partial English translation (10 pages).

* cited by examiner

COMPONENT FOR A TRANSPORTATION DEVICE, TRANSPORTATION DEVICE, AND METHOD FOR PRODUCING THE COMPONENT

BACKGROUND AND SUMMARY

The present invention relates to a component for a transportation device, to a transportation device having the component, and to a method for producing the component. The component is provided in particular for receiving an optical waveguide.

In modern transportation devices, optical waveguides can be part of a lighting device of the transportation device. The lighting device, for example in a vehicle, can comprise a plurality of vehicle lights, in particular front, rear and side lights, which serve for better visibility of the transportation device/vehicle in the dark or bad weather and for the associated increase in the safety of the vehicle.

A vehicle light known from the prior art is disclosed in the document DE 10 2004 028 970 A1. The light is in the form of a signal light and essentially consists of a light guide element, a light source and a coating. The light guide element has a light exit surface on its front side arranged in the emission direction and a reflection surface on its rear side. Light coupled into the light guide element via a light incoupling surface is transmitted within the light guide element by way of total reflection, wherein light impinging on the reflection surface is deflected toward the light exit surface and exits from the latter in the emission direction.

Against this background, it is an object of the present invention to provide a component for a transportation device, which can be produced relatively efficiently and cost-effectively and in which an optical waveguide can be accommodated in a sealed manner. Furthermore, it is an object to provide a transportation device having a component of this type, and a method for producing the component for the transportation device.

This object is achieved by a component, a transportation device and a method for producing a component according to the claimed invention.

The component for the transportation device comprises a support structure, a cover portion, an elastic sealing portion which is formed between the support structure and the cover portion and is connected in an integrally bonded manner to the support structure and/or to the cover portion, and an optical waveguide. The support structure, the cover portion and the sealing portion bound a receptacle which is sealed by way of the sealing portion and in which the optical waveguide is accommodated.

In an integrally bonded manner can mean here a connection in which the connecting partners according to the general definition are held together by atomic or molecular forces. In an integrally bonded manner can mean in particular are only separable by being destroyed. In particular, in an integrally bonded manner can mean that no additional adhesive layer is provided between the elements connected in an integrally bonded manner, i.e. the elements are not adhesively bonded to one another, but rather are, for example, cast on one another in an injection molding process.

In the case of the component configured in this way, the receptacle for the optical waveguide is sealed from the surroundings by the sealing portion. The component can therefore be arranged in the region of the exterior of the transportation device without having to provide an additional seal between the support structure and the cover portion. The sealing portion therefore takes on the task of accommodating the optical waveguide and acts synergetically at the same time as a seal between the support structure and the cover portion. As a result, the assembly of the component can be simplified.

The optical waveguide is protected in the receptacle against effects of the weather, in particular rain, splash water, snow and road salt. Advantageously, in particular that part of the component which consists of the sealing portion and the support structure, which is connected in an integrally bonded manner to the sealing portion, or the cover portion connected in an integrally bonded manner to the sealing portion can be produced comparatively simply by way of a two-component injection molding process. The sealing portion can be cast directly on the cover portion or the support structure.

The support structure is preferably formed integrally and/or monolithically (from a casting). It can be in the form of a profile which, as viewed in cross section, can have a base and two side limbs extending away from the base at mutually opposite ends of the base. The profile can have a constant thickness and/or can be substantially concave, in particular U-shaped or W-shaped. The receptacle can be arranged in the region of the base. The support structure can be provided with a depression which is formed in the region of the base. The depression can extend from the base in the same direction as the side limbs or in the opposite direction. In the former case, the depression preferably forms part of the receptacle. The optical waveguide can be arranged at least in sections, as viewed in cross section, in the depression.

The support structure is preferably designed, at least in the region of the receptacle for the optical waveguide, in such a manner that it deflects light, which is emitted from the optical waveguide into the receptacle, at least partially in the direction of the cover portion. For this purpose, the support structure can be designed to reflect, in particular to be light-scattering or reflective, at least in the region of the receptacle. The desired scattering/reflection of the light can be realized in a comparatively simple manner if the support structure is produced from a (bright) opaque material, in particular from white thermoplastic.

The cover portion is preferably designed and arranged in such a manner that it covers the support structure, wherein the optical waveguide is arranged in sections or completely (in particular as viewed in cross section) between the cover portion and the support structure. In a top view of the component (looking at the cover portion), the optical waveguide and/or the support structure are preferably arranged behind the cover portion, i.e. between the cover portion and the support structure. In other words, the cover portion preferably runs along an outer side of the support structure on which the optical waveguide is arranged. Preferably, the cover portion outside its region bounding the receptacle is spaced apart at least in sections from the support structure.

As viewed in the cross section through the support structure, the cover portion and/or the light guide element, the cover portion (apart from its region of the receptacle for the optical waveguide) preferably has substantially the same geometry as the support structure. Substantially the same geometry can mean here that the geometries differ at most due to manufacturing tolerances. The cover portion, like the support structure, can be in the form of a profile. In this case, the cover portion, as viewed in cross section, preferably follows the contour of the support element, i.e. the cover portion and the support structure, at least outside the receptacle, run parallel to one another at least in sections. Alternatively, the cover portion can be plate-like or shaped independently of the support structure, with the proviso that the cover portion covers the support structure (and the sealing portion and the optical waveguide). In all of these cases, the distance between the support structure and the cover portion can be defined by the configuration of the elastic sealing portion when the cover portion is fastened to the support structure.

Preferably, the cover portion forms a portion of an exterior light lens or the entire exterior light lens. The cover portion therefore bounds the component preferably toward the surroundings of the component. In the installed state on the transportation device, the cover portion/the exterior light lens can be characterized in that it bounds the component toward the surroundings of the transportation device. The component is therefore preferably configured in such a manner that light propagating from the optical waveguide into the receptacle of the optical waveguide furthermore propagates directly through the cover portion into the surroundings of the component and/or after being reflected at the support structure. For this purpose, provision is preferably made that a light exit region of the cover portion bounding the receptacle is light-permeable (transparent or translucent; clear or colored) at least in sections, in particular completely. The light exit region of the cover portion, as viewed in cross section through the optical waveguide, is preferably free from overlapping with the sealing portion.

The cover portion can additionally have a translucent or substantially opaque/light-impermeable decorative portion outside the light exit region. The decorative portion can overlap the sealing portion at least in sections on its side facing the cover portion, and therefore the sealing portion is hardly visible or (in the case of an opaque decorative portion) is even completely concealed. The decorative portion is preferably visible from that side of the cover portion which is opposite the support structure. The decorative portion can be adjacent to the light exit region, and therefore a sharp, high-contrast delimitation of the light exit region can be provided. Furthermore, the cover portion can make contact with the sealing portion via the decorative portion, and therefore the decorative portion is arranged on a side of the cover portion facing the sealing portion. The decorative portion can be in the form of a film. The cover portion or a remainder of the cover portion not containing the decorative portion can be formed monolithically.

In a preferred variant, the component is provided as the covering element/panel for an assembly of the transportation device. The component can in particular form a frame for the assembly. The optical waveguide and the light exit region preferably run along a circumference of the frame to represent contour lighting. If the support structure and/or the cover portion are/is in the form of a profile, provision can be made to this end that a longitudinal extent of the profile runs along a path with a plurality of portions running relative to one another at an acute angle (the portions not having to be adjacent to one another).

The receptacle for the optical waveguide is bounded by the cover portion, the sealing portion and the support structure. The receptacle is preferably designed to accommodate the optical waveguide therein in a form-fitting or force-fitting manner. The sealing portion can have a recess, wherein the recess forms part of the receptacle. In a particularly preferred variant, the elastic sealing portion clamps the optical waveguide by deformation of the sealing portion. In particular, a thermoplastic elastomer, TPE, or a thermoplastic polyurethane, TPU, can be provided as the material for the sealing portion. The sealing portion can be formed monolithically and its material can be directly adjacent to a material of the support structure and/or to a material of the cover portion.

The sealing portion can have a first part in which the recess is formed. Furthermore, the sealing portion can have a thinner second part which extends from the first part and runs in an intermediate space between the support structure and the cover portion along a surface of that element of the component (cover portion or support structure) to which the sealing portion is connected in an integrally bonded manner. The second part can be provided with sealing louvers which can be formed monolithically with the rest of the sealing portion and provide further sealing between the cover portion and the support structure. If the support structure and the cover portion are each in the form of a profile, the sealing louvers preferably produce further sealing between the cover portion and the support structure in the region of the side limbs.

In order to be able to fasten the optical waveguide easily, but nevertheless captively, in the receptacle or in the recess, the sealing portion can also be provided with a holding device. The holding device can be realized by side walls of the sealing portion that bound the recess and can be provided with an undercut. As viewed in cross section, the following is true: if the sealing portion is connected in an integrally bonded manner to the cover portion, the undercut can be designed in such a manner that the distance between the side walls at the end of the recess adjacent to the cover portion is greater than the distance between the side walls at the end of the recess remote from the cover portion. If the sealing portion is connected in an integrally bonded manner to the support structure, the undercut can be designed in such a manner that the distance between the side walls at the end of the recess adjacent to the support structure is greater than the distance between the side walls at the end of the recess remote from the support structure.

The holding device can therefore be designed to hold the optical waveguide captively, by at least elastic deformation of the holding device, on either the support structure or the cover portion to which the sealing portion is connected in an integrally bonded manner. In other words, if the sealing portion is connected in an integrally bonded manner to the support structure, the holding device can be designed to secure the optical waveguide on the support structure. If, by contrast, the sealing portion is connected in an integrally bonded manner to the cover portion, the holding device can be designed to secure the optical waveguide on the cover portion. The side walls can be provided with securing lips as part of the holding device, at the ends thereof at which the recess is narrowest, the securing lips being designed to be deformed in particular elastically when the optical waveguide is inserted into the receptacle, and then to keep the optical waveguide clamped in the receptacle.

In the final state of the sealing portion, in which the cover portion is mounted on the support structure, at least the first part of the sealing portion is preferably clamped (compressed) between the cover portion and the support structure. The sealing portion is preferably configured to reduce the size of the receptacle as a result of this clamping in order thereby to increase the holding force acting on the optical waveguide. This makes it possible synergetically to easily introduce the optical waveguide into the receptacle and then to secure same sealed precisely in the receptacle.

The optical waveguide preferably comprises one or more light guide fibers or light guide fiber bundles. It can have a diameter of at most 2 cm, at most 1 cm, at most 6 mm, at most 2 mm or at most 1.5 mm. The light guide fiber(s) can contain a plurality of cores in a sheath (what are referred to as "multi-core fibers"). The optical waveguide is preferably designed to conduct light within its interior (in particular its core/its cores) by total reflection. The optical waveguide is preferably provided with an outcoupling device which is configured to emit ("outcouple") light from the interior into the receptacle. The outcoupling device can have corresponding scattering bodies or material regions of the optical waveguide with a correspondingly adapted refractive index in order to provide the outcoupling. The light propagating in the core/in the cores of the optical waveguide is, in other words, preferably deflected by way of the outcoupling device such that it leaves the optical waveguide and preferably passes directly (without passage through a further refractive index transition) into the receptacle. From the receptacle, a portion of the light can propagate directly in the direction of the light exit surface of the cover portion and through the latter into the surroundings of the component. Another portion of the light is scattered at the surface of the support structure bounding the receptacle before it propagates through the light exit surface.

The transportation device proposed here can be in particular a vehicle (for example a ground-based vehicle, aircraft or watercraft). It comprises a component described in detail above. The support structure is fastened (preferably releasably) to the cover portion and the component is preferably arranged on the exterior of the transportation device such that the cover portion is directed outward with respect to the transportation device.

Since the component has a receptacle which is sealed in relation to the surroundings, the component is preferably part of the exterior lighting device of the transportation device. However, it can alternatively be part of the interior lighting of the transportation device. The component can be a panel, covering or cladding of a portion of the transportation device. The portion can be a vehicle component, for example a headlight, a rear light, a radiator grille, a sensor, a bumper, a side sill, a roof or an A/B/C pillar. The optical waveguide and the light exit surface can run in particular along a contour of a structural element or an assembly of the transportation device such that the structural element/assembly is more easily visible, for example, at night.

The method is provided for producing a component, described above in detail, for a transportation device and comprises carrying out a two-component injection molding process with the steps of: firstly injecting a first molding compound into a cavity of a first injection mold such that one of the following parts of the component is formed: a support structure of the component or a cover portion of the component; and secondly injecting a second molding compound into a cavity of a second injection mold while the part formed in the step of the first injection is arranged in the second cavity, so that an elastic sealing portion is cast on the part formed in the step of the first injection. That part of the component on which the sealing portion is arranged is forcibly removed from the injection mold and/or removed from the mold by a slide if the sealing portion is provided with an undercut. Subsequently, the other part of the component which is not formed in the step of the first injection is provided.

If, therefore, the support structure of the component has been produced during the first injection, the support structure is brought during the second injection into the cavity of the second injection mold, for example is placed therein or rotated with respect to the second cavity by way of turning plate technology or rotary table technology in order to cast the elastic sealing portion onto the support structure. In this case, the above-mentioned other part (which has not yet been produced) is the cover portion. The latter is provided, for example is produced separately, by way of injection molding. If, by contrast, the cover portion of the component has been produced during the first injection, the cover portion is brought during the second injection into the cavity of the second injection mold, for example is placed therein or rotated with respect to the second cavity by way of turning plate technology or rotary table technology in order to cast the elastic sealing portion onto the cover portion. In this case, the other part which has not yet been produced is the support structure. The latter is provided in turn, for example produced separately, by way of injection molding.

An optical waveguide is then provided and arranged on the sealing portion. The optical waveguide is preferably clamped in the above-explained recess of the sealing portion or introduced at least in sections into the depression of the support structure. The cover portion, the sealing portion and the support structure are finally arranged in such a manner that the cover portion, the sealing portion and the support structure form a receptacle which is sealed by the sealing portion and in which the optical waveguide is arranged.

The words "comprising", "having", "with" and the like that are used in this disclosure should not be considered to be conclusive. In particular, the wording "comprising a" in this context means "comprising at least one", i.e. "comprising a" does not mean that no further corresponding elements are present. Instead, the plural (comprising two or more) is likewise disclosed here. For example, the expressions "comprising an elastic sealing portion", "comprising an optical waveguide", and "comprising a support structure" should be understood such that the component may have one or more sealing portions, one or more optical waveguides, or one or more support structures. Moreover, in this disclosure, "at least in sections" can mean "in sections or completely".

Preferred embodiments of a component for a transportation device, the transportation device and a method for producing the component will now be explained in more detail with reference to the appended schematic drawings that are not true to scale.

DETAILED DESCRIPTION OF THE DRAWINGS

Figure 1:
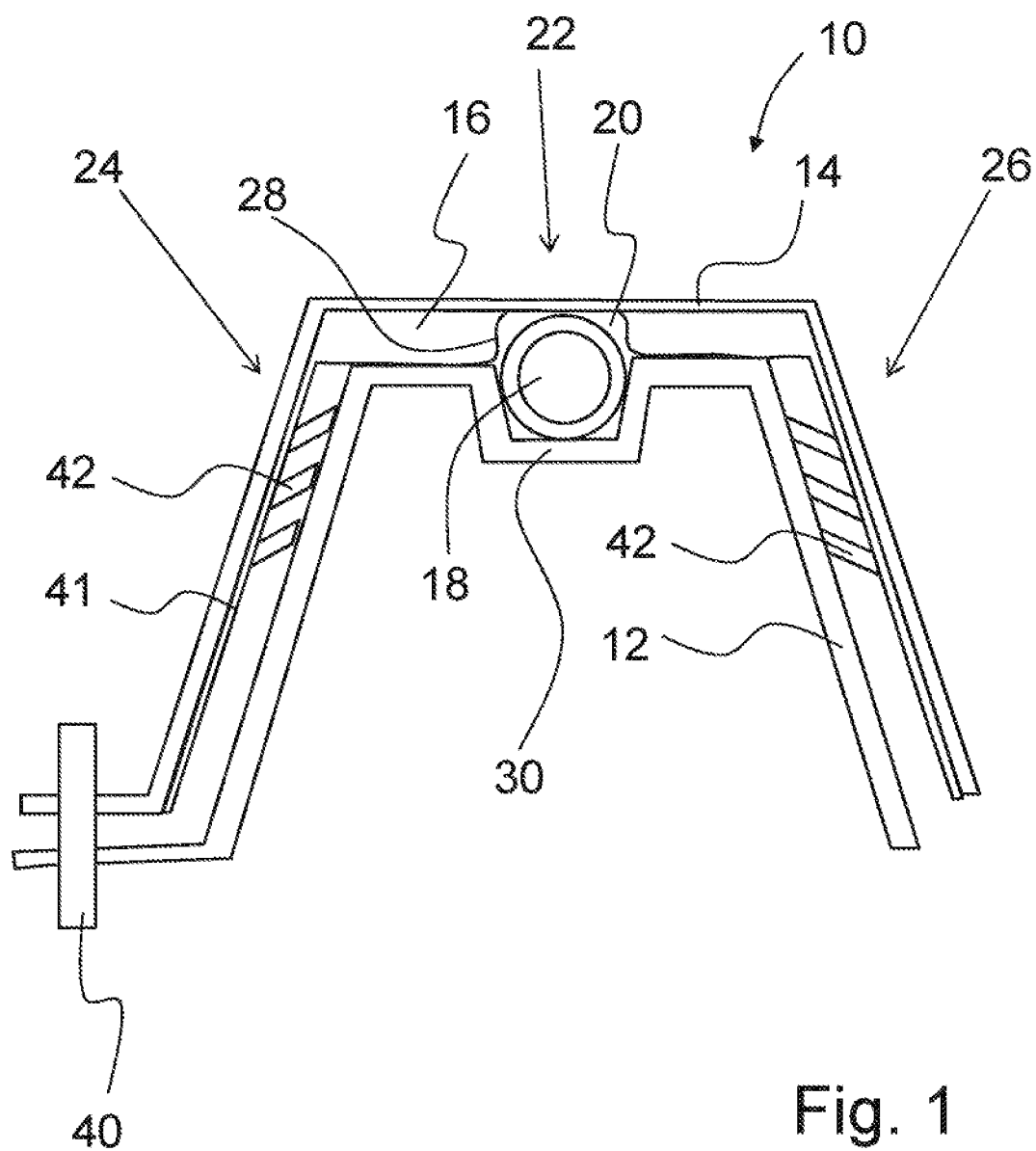
FIG. 1 shows a first embodiment of a component in a cross sectional view, wherein the sealing portion is connected in an integrally bonded manner to the cover portion, and the support structure has the depression in which the optical waveguide is arranged in sections.

FIG. 1 shows a component 10 which is designed here by way of example as a frame for a front-side covering of a transportation device 100. The component 10 comprises a support structure 12, a cover portion 14, an elastic sealing portion 16 and an optical waveguide 18. The elastic sealing portion 16 is formed between the support structure 12 and the cover portion 14. In this variant, the sealing portion 16 is cast onto the cover portion 14 (by way of injection molding) and such that a direct connection (here without an intermediate layer, in particular without an adhesive layer) is produced between the cover portion 14 and the sealing portion 16. The connection between the cover portion 14 and the sealing portion 18 is therefore integrally bonded. The support structure 12, the cover portion 14 and the sealing portion 16 define a receptacle 20 which is sealed by the sealing portion 16 and in which the optical waveguide 18 is accommodated.

The component 10 is substantially in the form of a U profile, wherein the main direction of extent of the frame runs perpendicularly to the plane of the sheet, and the front side (visible side) of the component 10 is at the top in FIG. 1. The U profile has a base 22 running along the front side and two side limbs 24, 26 extending virtually parallel from the base in the direction of the rear side of the component 10 (at the bottom in FIG. 1). The support structure 12, the cover portion 14 and/or the sealing portion 16 are each produced by way of injection molding and therefore are each formed monolithically. The support structure 12 here is in the form of a (for example white) light-scattering thermoplastic and the sealing portion 16 is in the form of a thermoplastic elastomer, in particular thermoplastic polyurethane ("TPE/ TPU component").

In the region of the base 22 of the component 10, the cover portion 14 runs substantially flat, whereas the support structure 12 has a depression 30. The sealing portion 16 is likewise configured with a recess 28 in the region of the base 22. The depression 30 and the recess 28 together form the receptacle 20 for the optical waveguide 18 (cf. cross sectional view from FIG. 1) which is correspondingly likewise arranged in the region of the base 22 of the component 10 and extends along the frame (perpendicularly to the plane of the sheet in FIG. 1).

FIG. 1 illustrates the sealing portion 16 spaced apart from the optical waveguide 18 for the sake of better visibility, the optical waveguide 18 being arranged in a form-fitting manner in the depression. In the completely assembled state of the component 10, the support structure 12 and the cover portion 14 are pressed onto each other by a form-fitting fastening device 40 (a screw connection or rivet connection here), which is releasable without being destroyed, and therefore the sealing portion 16 is compressed in the radial direction with respect to the main direction of extent (i.e. vertically in FIG. 1). As a result, the sealing portion expands in the circumferential direction (accordingly horizontally in FIG. 1) and clamps the optical waveguide 18 such that the latter does not rattle while the transportation device 100 is traveling. With this mechanism, a surface of the sealing portion 16 adjacent to the optical waveguide 18 therefore forms a holding device 36 for the optical waveguide 18.

The sealing portion 16 extends from the base 22 of the component 10 in the form of a surface coating 41 along an inner side of the side limbs 24, 26, i.e. along an inner circumference of the profile. On the side limbs 24, 26 sealing louvers 42 are formed which extend from the cover portion 14 in the direction of the support structure 12 and lie against the latter in the mounted state of the component in order to provide further sealing between the cover portion and support structure. Each of the sealing louvers 42 can extend along the entire extent of the component 10 (perpendicularly to the plane of the sheet in FIG. 1).

The optical waveguide 18 comprises a light guide fiber with a core and a sheath. It is designed to outcouple the light propagating within the optical waveguide 18 by total reflection (in more precise terms in the core) by an outcoupling device, not illustrated specifically in the figure, into the receptacle 20. This outcoupled light finally exits through a light exit surface of the cover portion 14 in the direction of the front side and out of the component 10. The light exit surface here is that region of the cover portion 14 which is not covered by the sealing portion 16. The light exit surface is, for example, clear and transparent.

Figure 2:
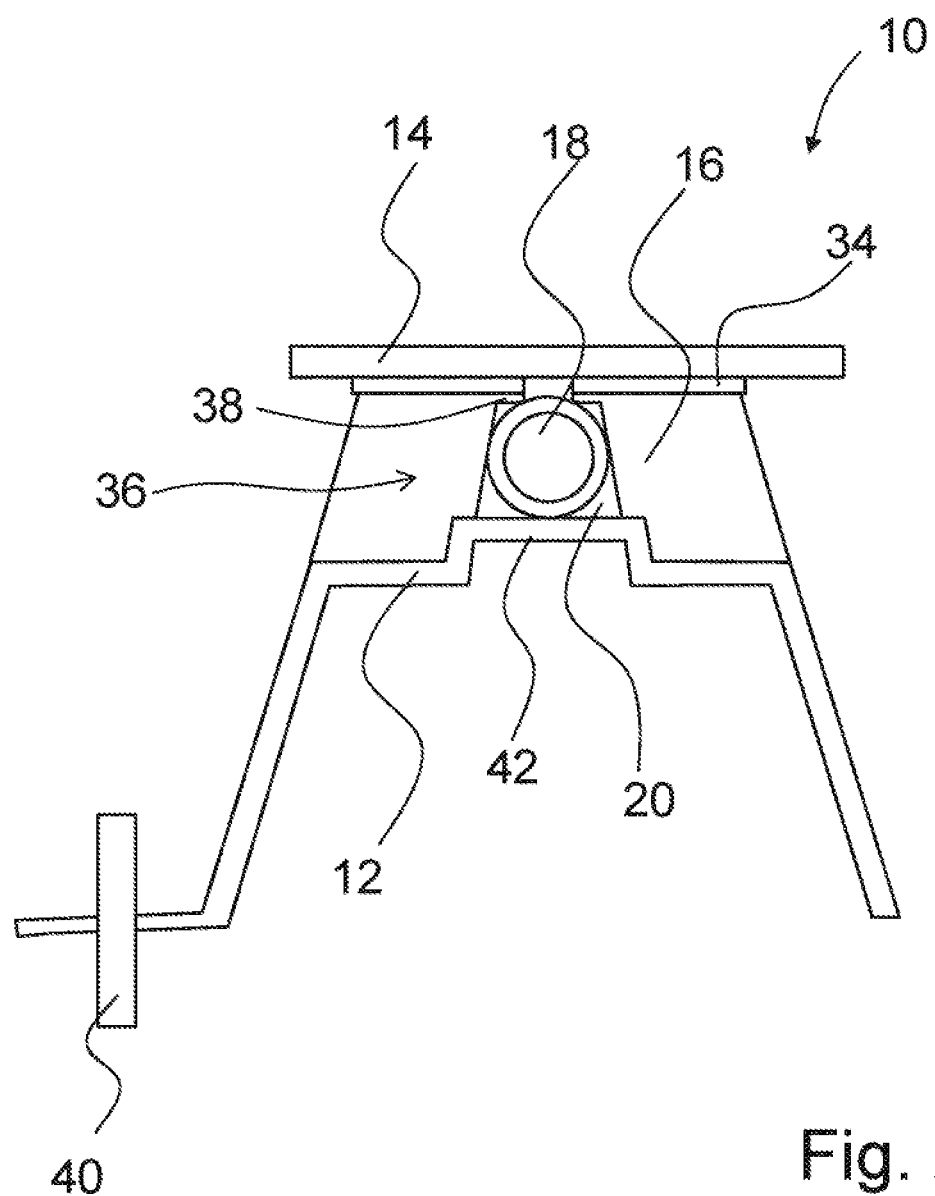
FIG. 2 shows a second embodiment of a component in a cross sectional view, wherein the sealing portion is connected in an integrally bonded manner to the support structure.

A further component 10 shown in FIG. 2 differs from the component from FIG. 1 in that the sealing portion 16 is not cast on the cover portion 14 but rather on the support structure 12. Furthermore, only the support structure 12, but not the cover portion 14, is in the shape of a profile. The cover portion 14 is illustrated in a plate-like manner in FIG. 2, but may also be shaped differently. On the rear side of the cover portion 14 facing the support structure 12, an opaque decorative portion 34 in the form of a decorative film is formed which has an opening in the region of the light exit surface. The decorative film connects the cover portion 14 in an integrally bonded manner to the sealing portion 16. Accordingly, the decorative portion 34 completely conceals the sealing portion 16.

In this variant, the holding device 36 is formed by an undercut of the sealing portion 16. The recess 28 thus tapers beginning from the support structure 12 toward the cover portion 14 such that the optical waveguide 18 is held in a force-fitting manner in the recess 28. Additionally, the holding device 36 contains securing lips 38 adjacent to the cover portion 14, the securing lips assisting the securing of the optical waveguide 18 in the recess 28. Since, in this variant, the absorption of force between the optical waveguide 18 and support structure 12 by way of the depression 30 is absent, the sealing portion 16 is larger and more solid than in the case of the variant from FIG. 1. Accordingly, the support structure 12 has an elevation 42 on which the optical waveguide 18 is supported, wherein the radial extent of the sealing portion 16, as viewed in the cross section from FIG. 2, is larger than the diameter of the optical waveguide 18. In the case of this variant, a fastening device 40 can be provided for fastening the component 10 to the transportation device 100.

Otherwise, the component 10 from FIG. 2 comprises all of the features of the component 10 from FIG. 1.

Figure 3:
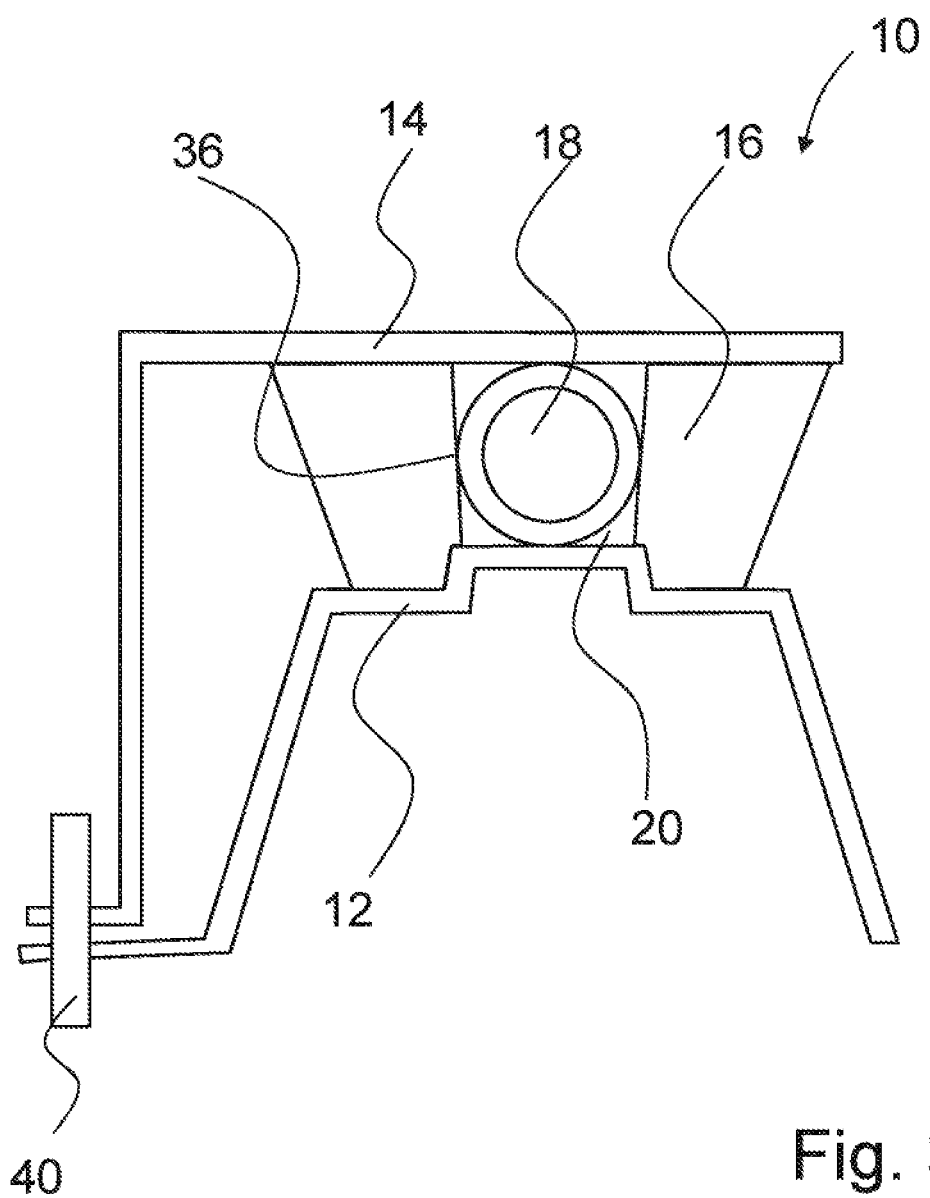
FIG. 3 shows a third embodiment of a component in a cross sectional view, wherein the sealing portion is connected in an integrally bonded manner to the cover portion.

A component 10 illustrated in FIG. 3 differs in turn from the component 10 from FIG. 2 in that the sealing portion 16 is again cast on the cover portion 14. In respect of the configuration of the receptacle 20 and the holding device 36, the cover portion 14 virtually takes up the role of the support structure 12, i.e. the receptacle 20 tapers toward the support structure 12. This undercut is sufficient here to secure the optical waveguide 18, and therefore the securing lips 38 are dispensed with. The cover portion 14 differs in respect of its profile from the support structure 12, these two parts, as in FIG. 1, being clamped on each other by the fastening device 40. The sealing portion 16 again has a portion in the form of a surface coating 41 on the cover portion 14.

Otherwise, the component 10 from FIG. 3 comprises all of the features of the component 10 from FIGS. 1 and 2.

Figure 4:
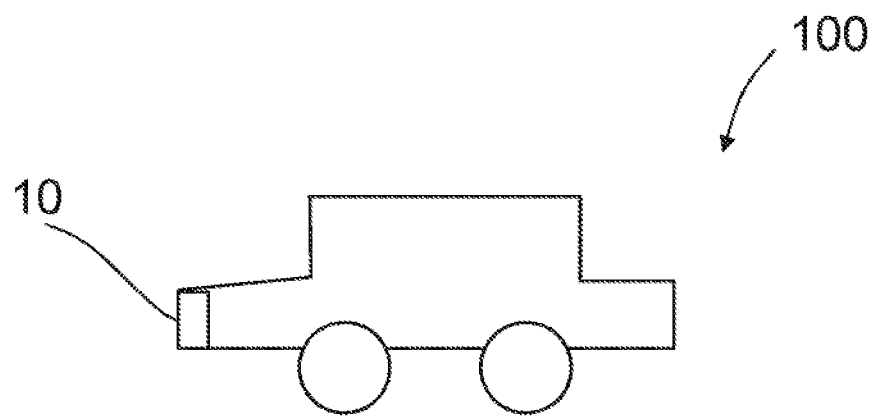
FIG. 4 shows an embodiment of a transportation device having the component, wherein the component is arranged in the region of the front of the transportation device.

FIG. 4 shows the transportation device 100 which here in particular is a vehicle. The transportation device 100 comprises the component 10 from one of FIGS. 1 to 3, wherein the support structure 12 is fastened releasably to the cover portion 14 by the fastening device 40. The component 10 is arranged as a frame for an assembly, in particular a covering panel (e.g. for a vehicle sensor system), or for another component of the vehicle. The optical waveguide 18 and the light exit surface run along a contour of the assembly or of the other component and form contour lighting as part of an exterior lighting device of the transportation device 100. The cover portion 14 is arranged on the outer side, i.e. on an outer surface, relative to the transportation device 100. The component can be secured on a portion of the transportation device 100 adjacent to the component 10 by the fastening device 40, in particular by a screw connection holding the support structure and the cover portion together.

Figure 5:
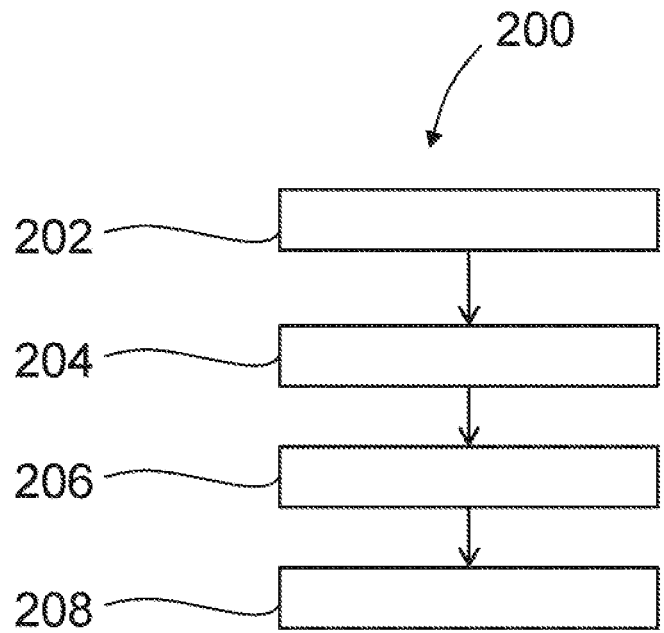
FIG. 5 shows an embodiment of a method for producing the component.

A method 200 illustrated in highly schematized form in FIG. 5 serves for producing the component 10 from FIG. 1. In the method 200, first of all a two-component injection molding process is carried out. The latter comprises firstly injecting 202 a first molding compound into a cavity of a first injection mold such that the support structure 12 of the component 10 is formed. Subsequently, a second injection 204 of a second molding compound into a cavity of a second injection mold is carried out while the support structure 12 which has been produced is arranged in the second cavity such that an elastic sealing portion 16 is cast on the support structure 12. The second injection mold can be the first injection mold if the second cavity is larger than the first cavity.

The cover portion 14 is then produced 206, for example, analogously to the support structure 12. Finally, an assembly step of arranging 208 the cover portion 14, the sealing portion 16 and the support structure 12 is carried out in such a manner that the cover portion 14, the sealing portion 16 and the support structure 12 form a receptacle 20 which is sealed by the sealing portion 16 and in which the optical waveguide 18 is accommodated. First of all, the optical waveguide 18 is placed into the depression 30 and the cover portion 14 with the sealing portion 16 cast thereon is then attached such that the optical waveguide 18 is arranged in the recess 28, and finally the cover portion 14 is clamped to the support structure 12 by the fastening device 40.

What is claimed is:

1. A component for a transportation device, the component comprising:
   a support structure,
   a cover portion,
   an elastic sealing portion which is formed between the support structure and the cover portion and is connected in an integrally bonded manner to the support structure or to the cover portion, and
   an optical waveguide, wherein:
   the optical waveguide comprises one or more light guide fibers,
   the support structure, the cover portion and the sealing portion bound a receptacle which is sealed by the sealing portion and in which the optical waveguide is accommodated, and
   the sealing portion clamps the optical waveguide by pressing against the optical waveguide.

2. The component according to claim 1, wherein:
   the support structure is formed monolithically and/or as a thermoplastic, and/or
   the support structure is reflective or light-scattering at least in sections.

3. The component according to claim 1, wherein:
   the support structure has a depression which forms part of the receptacle, and
   the optical waveguide is arranged at least in sections in the depression, as viewed in cross section through the optical waveguide.

4. The component according to claim 1, wherein the support structure is fastened to the cover portion so as to be releasable from the cover portion without being destroyed.

5. The component according to claim 1, wherein:
   a region of the cover portion that bounds the receptacle is light-permeable at least in sections, and/or
   the cover portion has a translucent or substantially opaque decorative portion which overlaps the sealing portion on its side facing the cover portion at least in sections.

6. The component according to claim 1, wherein:
   the sealing portion is in a form of a thermoplastic elastomer or a thermoplastic polyurethane, and/or
   a material of the sealing portion is directly adjacent to a material of the support structure and/or to a material of the cover portion.

7. The component according to claim 1, wherein the sealing portion is provided with a holding device which is configured to hold the optical waveguide captively on the support structure or on the cover portion.

8. The component according to claim 1, wherein the sealing portion is provided with a holding device which is configured to hold the optical waveguide captively on the support structure or on the cover portion by elastic deformation of the holding device.

9. The component according to claim 1, wherein:
   the optical waveguide is configured to emit light propagating in an interior of the optical waveguide into the receptacle.

10. A transportation device comprising:
    the component according to claim 1,
    wherein the support structure is fastened to the cover portion.

11. The transportation device according to claim 10, wherein the component is arranged on the exterior of the transportation device such that the cover portion is directed outward with respect to the transportation device.

12. A method for producing a component for a transportation device, the method comprising:
    carrying out a two-component injection molding process comprising:
      performing a first injection by firstly injecting a first molding compound into a first cavity of a first injection mold such that one of the following parts of the component is formed: a support structure of the component or a cover portion of the component, and
      performing a second injection by secondly injecting a second molding compound into a second cavity of a second injection mold while the part formed by the first injection is arranged in the second cavity, so that an elastic sealing portion is cast on the part formed by the first injection;
    providing the other part of the component that is not formed by the first injection; and
    arranging the cover portion, the sealing portion and the support structure such that the cover portion, the sealing portion and the support structure form a receptacle which is sealed by the sealing portion and in which an optical waveguide is accommodated,
    wherein the optical waveguide comprises one or more light guide fibers, and
    wherein the sealing portion clamps the optical waveguide by pressing against the optical waveguide.

* * * * *